United States Patent [19]

Porter et al.

[11] 3,833,305
[45] Sept. 3, 1974

[54] GAS ANALYZING APPARATUS

[75] Inventors: William A. Porter, Menlo Park; Irvin G. Burough, Santa Clara; Donald D. Kline, Palo Alto, all of Calif.

[73] Assignee: Commercial Electronics, Inc., Mountain View, Calif.

[22] Filed: Feb. 22, 1972

[21] Appl. No.: 227,976

Related U.S. Application Data

[63] Continuation-in-part of Ser. No. 858,817, Sept. 17, 1969, abandoned.

[52] U.S. Cl.............. 356/201, 250/573, 250/576, 356/244
[51] Int. Cl. ............................................ G01n 21/26
[58] Field of Search.................. 250/218, 573, 576; 356/201, 204–208

[56] References Cited
UNITED STATES PATENTS

| | | | |
|---|---|---|---|
| 3,628,028 | 12/1971 | Thorsheim | 250/218 |
| 3,727,066 | 4/1973 | Louderback et al. | 356/201 X |
| 3,736,431 | 5/1973 | Childs | 356/208 X |

Primary Examiner—Ronald L. Wibert
Assistant Examiner—F. L. Evans
Attorney, Agent, or Firm—Townsend and Townsend

[57] ABSTRACT

A gas analyzing apparatus employing optical analyzing means in which a gas sample is withdrawn from a gas flow and directly passed into a chamber. Opposing, spaced-apart walls of the chamber include optically aligned openings. Gas flow directionalizing ribs are upstream of the line of sight through the openings. Downstream of the line of sight the flow is deflected 90° and discharged into an enclosed space to prevent gas flow turbulence at the line of sight. An air flow is formed on the exterior of the chamber in a direction substantially perpendicular to the openings and flows past the openings. A light source and an optically sensitive detector are mounted on the exterior of the chamber adjacent to and in alignment with the openings in the chamber and are spaced from the chamber by the air flow so that the light source and the detector come in contact with the air flow but not with the gas sample. The detector output is compensated for gas density changes due to gas temperature and vapor content variations.

21 Claims, 9 Drawing Figures

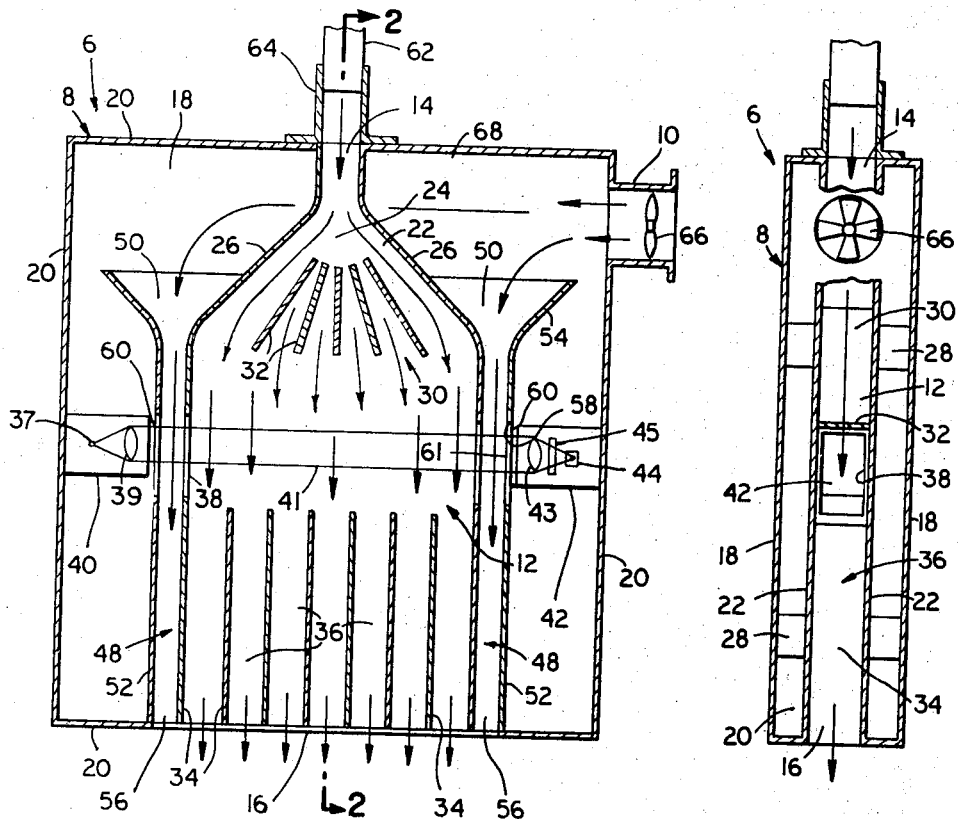
FIG_1
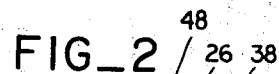
FIG_2
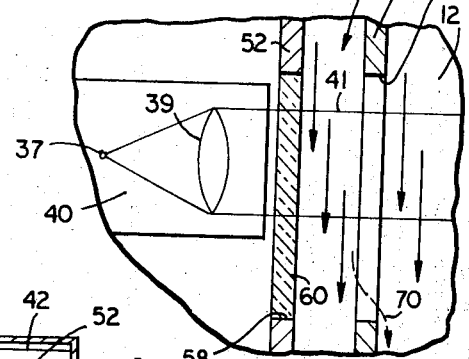
FIG_4
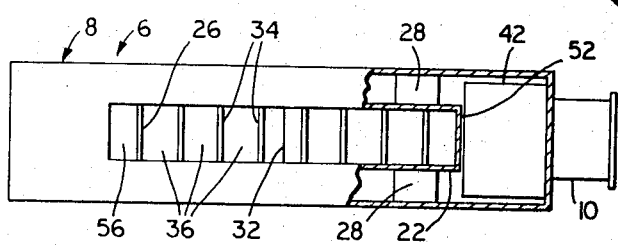
FIG_3

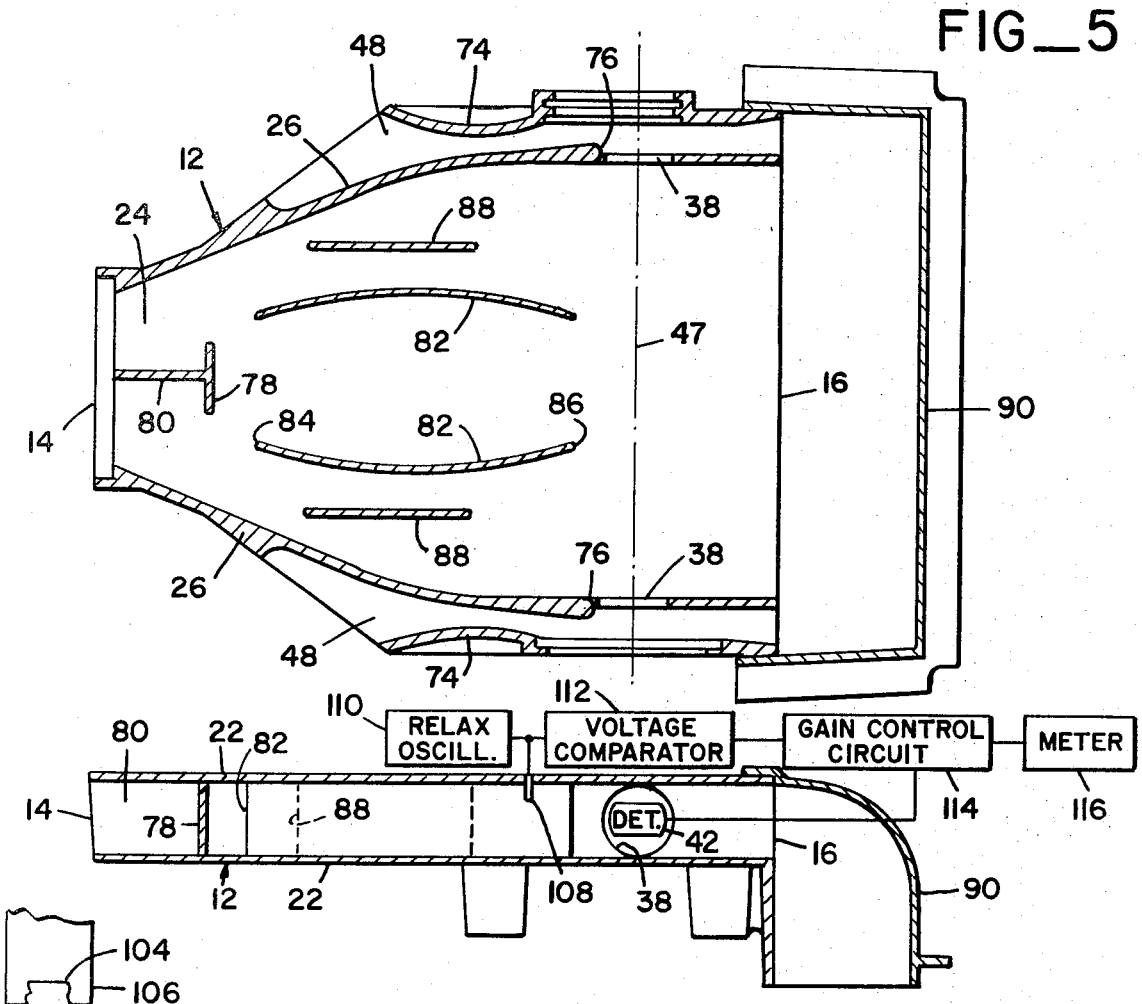
FIG_5
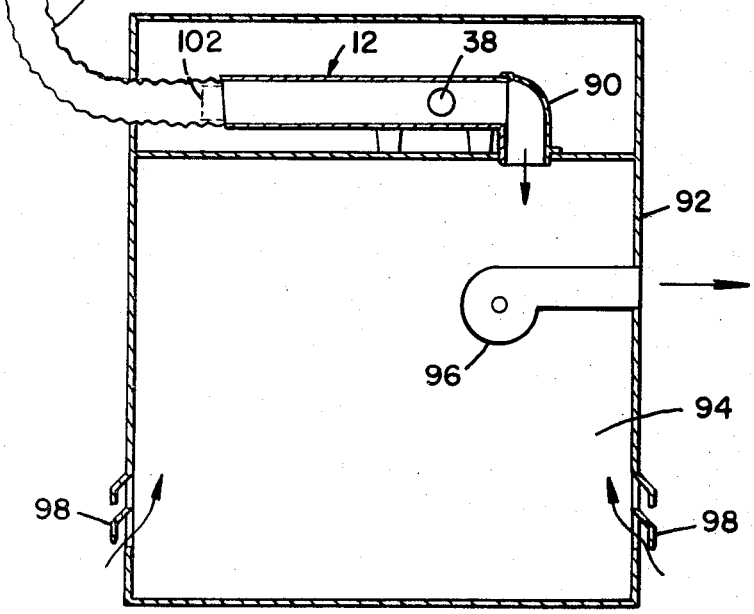
FIG_6
FIG_7

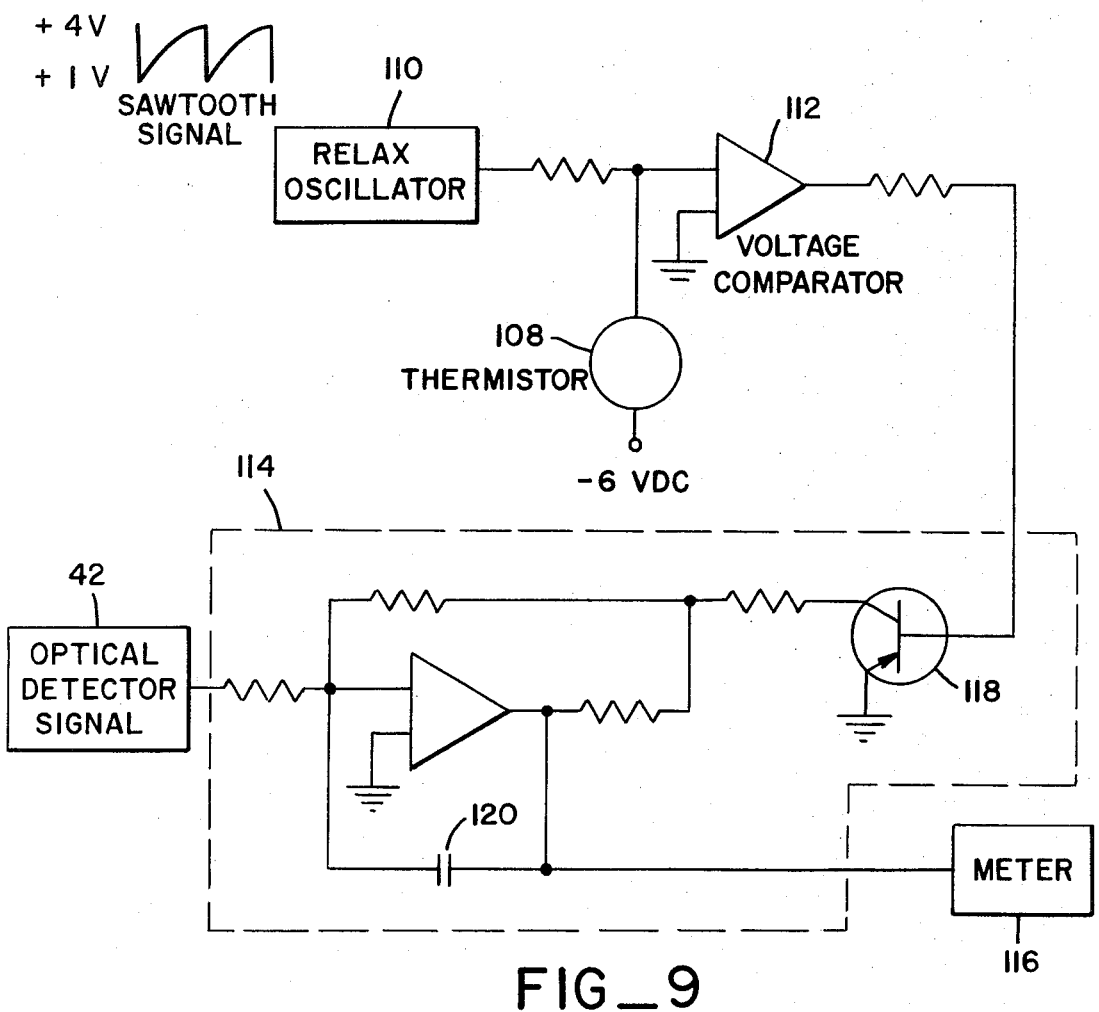
FIG_9
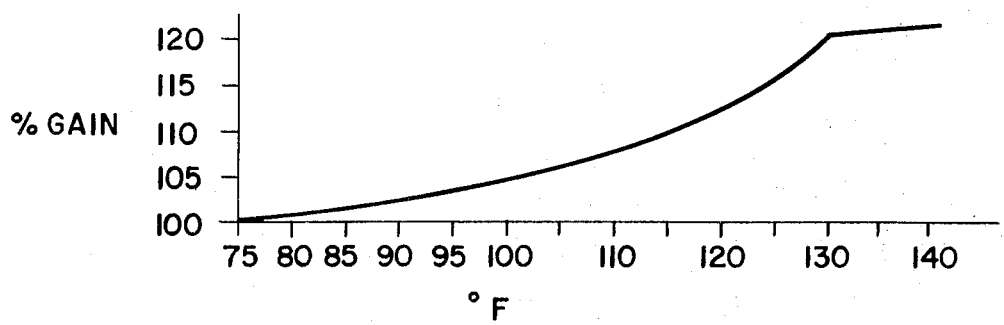
FIG_8

GAS ANALYZING APPARATUS

RELATED APPLICATIONS

This patent application is a continuation-in-part application of the copending patent application entitled GAS ANALYZING APPARATUS bearing Ser. No. 858,817, filed Sept. 17, 1969, now abandoned.

BACKGROUND OF THE INVENTION

Optical analysis of gases to determine their chemical contents has many applications. It allows monitoring the chemical composition of gases, particularly of exhaust gases such as emitted by automobiles or industry. Changes in the composition of the gas can thereby be detected and remedial action can be taken to optimize combustion processes, control air pollution or to assure that the gas has a required composition.

Generally speaking, such optical gas analyzers comprise a radiating source, such as a light source, which directs light beams through the gas sample, or the gas sample flow, onto an optical detector. Filter means are provided so that only light of a given wavelength or lengths can reach the detector.

Each component of the gas sample absorbs light of a certain wavelength at a rate which is a function of the ratio of that component in the sample (as well as of the distance the light travels through the sample) and which inversely affects the amount of light of that wavelength sensed by the detector. In this manner the ratio in the sample of a particular component can be determined. By suitably varying the wavelengths of light passed through the sample the presence of different components in the gas can be determined and quantified.

This method of analyzing gas as such is well known and is not part of this invention. However, since such gases, and particularly industrial or automotive exhaust gases include a large number of contaminants which collect on surfaces facing the gas flow, including windows shielding the light source and the detector from the gas, prior art detection apparatus has not functioned fully satisfactory. Contamination of the windows, or of the source and the detector should they be placed directly into the flow, does not permit continuous operation of such apparatus and requires its frequent cleaning. Moreover, if such cleaning operations are neglected the readings taken by the detector become a function of the degree of contamination of such surfaces and, therefore, do not reveal the true composition of the gas sample. Since control of exhaust gases becomes increasingly important as a result of the serious air pollution problems we presently face these shortcomings are particularly undesirable.

To avoid such contamination and assure uninterrupted operation of the apparatus the gas sample flow is frequently cleaned before it is analyzed. Such cleaning requires relatively complicated equipment, including filters that need frequent replacement, and is therefore costly to install and operate.

In addition, the readings are influenced by the presence or absence of gas turbulence at the point where the light beam crosses the gas sample and by the density of the gas at that point. The density in turn is a function of both the gas temperature and the presence or absence and the amount of any vapor in the sample. In most common applications, particularly in the automobile exhaust analyzing field, it is water vapor that may affect the read out.

In the prior art the gas sample was taken from the gas stream and pumped at a known, constant and controlled rate past the line of sight of the optical detectors to minimize turbulence. The necessary gas pumps are costly, require maintenance and make the instrument substantially more complicated and expensive.

To eliminate variations in the readings due to gas density changes, the exhaust gas temperature was controlled, usually by cooling the gas before its analysis by optical detectors. The cooling apparatus was set so that gas crossing the line of sight has a constant temperature. In a given application, say the automotive field, the water vapor content and the exhaust gas density thus remained constant and any changes in the reading were caused by changes in the content of the particular substance searched for. However, this result could only be obtained by employing complicated, expensive cooling equipment that required constant maintenance and frequent replacement.

SUMMARY OF THE INVENTION

The present invention provides an apparatus for optically analyzing gas samples including surface contaminating substances in which the light source and the optical detector, or windows separating them from the gas sample, are maintained clean and free of contaminating substances. Briefly, the apparatus comprises a container for the gas sample having opposing walls which include aligned openings forming an optical path therebetween. Means for passing a clear fluid, such as an air stream, past the openings and means for positioning the light source and the optical detector in the optical path on the opposite sides of the air streams are provided. The air streams prevent gas from contacting and contaminating the light source and the detector. Since the openings in the gas chamber remain open, that is, they are not closed with a transparent member such as glass windows, the optical path or line of sight between the light source and the detector remain optically clear and uncontaminated to assure an accurate determination of the composition of the gas sample. In the preferred embodiment of the invention the gas chamber is disposed in a housing which includes means, such as an air blower, for positively inducing the air flows past the openings.

A flexible hose or the like is connected to an intake of the chamber and placed in an exhaust gas conduit such as the tail pipe of an automobile. A portion of the exhaust gas flow is thereby diverted into the hose and hence into the chamber. No pumps or cooling equipment are employed. The flow rate and the gas temperature and vapor content vary between generally known limits. In automobile gas analysis temperature variations at the tail pipe are usually between 75° F and 130° F when the motor idles at moderate speed. Exhaust gas speed in the tail pipe on the other hand can vary widely depending upon the exhaust pipe diameter, engine compression and the like.

Exhaust gas turbulence at the line of sight due to the absence of a separate flow pump is obtained by directionalizing the gas flow between the chamber intake and the line of sight. For this purpose, a baffle plate is positioned closely adjacent the intake and faces the gas flow entering the chamber to momentarily deflect a center portion of the flow in a lateral direction. The chamber width increases from the intake to the line of sight to substantially reduce the gas flow speed. A pair of spaced apart center ribs are symmetrically arranged with respect to a longitudinal axis of the chamber and extend generally in the direction of the gas flow from adjacent the lateral ends of the baffle plate to just upstream the line of sight. A relatively short side rib is disposed between each center ribs and the adjacent sidewall and has a longitudinal extent substantially less than that of the center ribs. This construction of the interior of the gas flow chamber results in a practically laminar gas flow across the line of sight with flow turbulences encountered in gas flow through pipes, hoses and the like, eliminated.

To eliminate gas turbulence due to atmospheric air movements such as wind, the exhaust gas is deflected 90° downstream of the line of sight and discharged into an enclosed space. From the enclosed space the exhaust gas is evacuated at a constant rate. Even strong wind on the exterior, as when using the instrument in the open, has no effect on the laminar gas flow across the line of sight while the prior art gas pumps are eliminated.

Gas density variations due to temperature changes in the gas passing the line of sight are sensed and transformed into electrical pulses which nonlinearly control the gain of signals generated by the optical detector. The electronic gain adjustment is achieved by placing a thermistor in the gas flow immediately upstream of the line of sight for generating a first temperature responsive signal. A second, exponentially shaped signal is generated and compared with or superimposed on the first signal from the thermistor and forms the input of a voltage comparator. The comparator output is the inverse to the voltage input and is used to open and close a transistor switch coupled to a gain circuit for the optical detector signals in which the gain is a function of the proportional closing time of the switch. Variations in the detector signals due to gas temperature changes and resulting vapor content variations are thus compensated.

By continuously monitoring the physical characteristics, e.g., the temperature and therewith the density of the exhaust gas, and electronically compensating the detector signals as a function of changes in the gas rather than physically changing, e.g. controlling the temperature of the gas, the construction of the analyzer is greatly simplified. Frequent operating problems are eliminated and construction and operating costs of the analyzer are substantially reduced.

BRIEF DESCRIPTION OF THE DRAWINGS

FIG. 1 is a plan view, in section, of a gas analyzing apparatus constructed in accordance with the present invention;

FIG. 2 is a sectional side view with parts broken away and is taken on line 2—2 of FIG. 1;

FIG. 3 is an end view of the downstream side of the apparatus shown in FIG. 1 with parts broken away to show interior portions;

FIG. 4 is a fragmentary, enlarged sectional view along the optical axis between the light source and the optical detector in the vicinity of one of the air flow passages;

FIG. 5 is a detailed plan view, in section, of gas flow chamber which is constructed to convert turbulent gas flow into substantially fully laminar gas flow past a line of sight through the chamber and which includes a downstream gas deflector to isolate the gas flow in the vicinity of the line of sight from exterior air movements;

FIG. 6 is a side elevation, in section, of the chamber illustrated in FIG. 5 and includes a schematic block diagram illustrating the temperature compensation provided by the present invention;

FIG. 7 is a schematic, side elevational view, in section, of the installation of the chamber illustrated in FIGS. 5 and 6 in a wind protecting housing;

FIG. 8 is a diagram illustrating the required signal gain for analyzing automobile exhaust gas for CO (carbon monoxide) and HC (hydrocarbons); and FIG. 9 is a circuit diagram illustrating the electronic arrangement for nonlinearly adjusting meter gain as a function of the gas temperature immediately upstream of the line of sight.

DESCRIPTION OF THE PREFERRED EMBODIMENTS

Referring first to FIG. 1, an optical gas analyzing apparatus 6 constructed in accordance with the invention generally comprises an outer housing 8 having an air inlet duct 10 and a gas flow chamber 12 disposed interiorly of the housing and extending across the length thereof from a gas inlet 14 to a generally rectangularly shaped gas outlet 16. The housing has a rectangular configuration and is defined by a pair of face plates 18 interconnected and spaced apart by housing sides 20 whereby the interior of the housing is hermetically sealed from the exterior.

Referring to FIGS. 1 and 2, chamber 12 preferably has a uniform depth over its full length and is defined by a pair of generally bottle shaped top and bottom panels 22 having neck portions 24 adjacent gas inlet 14. The panels are interconnected and spaced apart by a pair of Z-shaped chamber or sidewalls 26 extending from the gas inlet to gas outlet 16 and sealing the chamber from the interior of housing 8. The chamber panels are further spaced from and secured to housing face plates 18 by a plurality of suitable mounting blocks 28.

In the illustrated embodiment of the invention, in which the apparatus is constructed for analyzing the CO content of automobile exhaust gases, the neck portion flares outwardly to increase the width of the chamber to about 6 inches for purposes more fully set forth hereinafter.

A deflector generally identified by reference numeral 30 is mounted interiorly of the chamber between panels 22 opposite from gas inlet 14 and can be constructed of a plurality of vanes or ribs 32 arranged to evenly spread the gas flow over the full width of the chamber into a substantially laminar gas flow in the vicinity of openings 38. The laminar gas flow past openings 38 is protected from disturbance from exterior air movements at the outlet from chamber 12 as by providing a plurality of parallel baffle walls 34 downstream of openings 38 which define columns 36 leading the gas flow towards outlet 16. The baffle walls prevent wind or drafts on the exterior of housing 8 from reaching the flow of the gas sample in chamber 12 and particularly in the space between deflector 30 and baffle walls 34.

Chamber walls 26 include optically aligned openings 38 positioned in the space between deflector vanes 32 and the inner end of baffle walls 34. A radiating source 40, such as a source of visible light, and a corresponding radiation detector 42 are suitably mounted to housing 8 adjacent to openings 38 on a line of sight 45 through the chamber. The source includes a light emitter 37 and a collimating lens 39 that establishes a beam 41 of light extending through openings 38 and gas flow chamber 12. The detector is provided with a gathering lens 43 which projects radiation from the source on a sensor 44 of a conventional construction. The detector further includes a filter 45 to remove from beam 41 all radiation having wavelength components other than wavelengths absorbed by the gas sample component or components under investigation. Alternatively the filter can be incorporated into the source or can be placed independently of either one.

The source and the detector are spaced some distance from the chamber walls to permit construction of an air flow passageway 48 between them and the walls.

Referring to FIGS. 1–4, the air flow passageways are generally defined by a pair of panels 50 which are aligned with chamber panels 22 or are integrally constructed therewith and an end wall 52 which extends generally parallel to chamber walls 26 except for an outwardly extending intake end 54 which defines the inlet of the passageway. The passageway terminates at an outlet portion 56 disposed adjacent gas outlet 16 of chamber 12.

End walls 52 of passageways 48 each include a cutout 58 which is aligned with openings 38 in chamber walls 26 to form a continuous optical path between radiating source 40 and detector 42. A transparent member, such as source and detector windows 60 can be inserted in the cutouts to physically separate the source and the detector from the air flow and the passageway. However, the windows can be omitted and cutouts 58 can be left open.

Turning now to the operation of the gas analyzing apparatus of the present invention, gas inlet 14 is connected to a source of the gas to be analyzed, say an automobile exhaust pipe 62 via a flexible hose coupling 64. Air is forced into the interior of housing 8 by connecting air duct 10 with a source of pressurized air or by actuating a conventional air blower 66 mounted to the duct. An air flow commences at the duct, continues through an upper housing portion 68, around gas inlet 14, into passageways 48 and exits through outlet portions 56. The automobile engine (not shown) is now started so that its exhaust gases enter chamber 12, are spread over the full width of chamber 12 by deflector 30 and flow across the light beam 41 between openings 38 in chamber walls 26.

Radiation source 40 is energized to direct radiation, say, light, through source window 60, the air flow in passageway 48, through opening 38, through the gas in chamber 12 and hence past detector window 61, filter 45 onto sensor 44 of detector 42. The presence in the gas of a compound absorbing light sensed by detector 42 since filter 45 permits only light of that wavelength to reach sensor 44. The amount of light reaching the sensor is a function of the ratio of such compound in the gas and the distance the light travels through the gas. Since the light travel distance remains constant, a reading indicating the ratio of the compound in the gas is obtained from the detector in a known manner. To detect other compounds in the gas filter 45 is changed to permit passage of light of another wavelength. In this manner the composition of the gas can be quantitatively as well as qualitatively determined.

The chamber width to be traversed by light beam 41 is selected according to the desired light sensitivity of the detector. For example, in the above-reference CO analysis of automotive exhaust gases it is desired to obtain a full scale reading at a CO concentration of 5 percent. For such a reading a chamber width of 6 inches provides best results. For other gases or operating conditions the chambers width is adjusted accordingly.

While the gas is being analyzed, intermittently or continuously, the air flow in passageway 48 prevents any gas flowing through chamber 12 from reaching windows 60, 61 or, if cutouts 58 are left open, from reaching the light source or the detector. Thus, even if the gas includes contaminating particles, such as water droplets, dust particles, carbon and the like which contaminate surrounding surfaces, light beam 41 reaches detector 42 at virtually 100 percent intensity (except for light absorption by the gas which is used for the above-described gas analysis) since the optical path between the source and the detector and particularly through windows 60, 61 remains clear.

Referring particularly to FIGS. 4 and 5, an intermixing between gas flowing in chamber 12 and air flowing in passageway 48 is minimal if the two flow in the same direction at like speeds and if the gas and air are at like pressures since openings 38 as such cause almost no disturbance of the two flows.

Best results have been obtained by restricting the effective cross section of passageway 48 just upstream of the line of sight 47 as by giving outer wall 74 a slight concave configuration (see FIG. 5). Intermixing of the air flow in passage 48 with the gas flow across the line of sight is further reduced by biasing the air flow in passage 48 slightly away from opening 38 in the chamber sidewall at an angle of no more than a few degrees. For this purpose it is preferred to increase the thickness of chamber sidewall 26 just upstream of the sidewall openings at points 76 illustrated in FIG. 5.

The pressure of the air flow in passageway 48 can be slightly increased over the pressure of the gas flow in chamber 12 so that some air passes through openings 38 into the chamber, such mixing does not affect the analysis of the gas by detector 42 since it occurs at the lowermost (in the flow direction) end of opening 38 and downstream thereof, as indicated by arrow 70 (FIG. 4). Such mixing is downstream of light beam 41 between the light source and the detector and, therefore, has no influence on the reading obtained from the detector.

Referring to FIGS. 5–7, the construction of chamber 12 for obtaining laminar gas flow past chamber openings 38 is described in greater detail. From chamber inlet 14 sidewalls 26 taper outwardly from the longitudinal axis of the chamber to a maximum width (for CO and HC automobile exhaust analysis about six inches). From a point about one to one and a half inches upstream of line of sight 47 to chamber outlet 16 sidewalls 26 are parallel and the chamber width is constant.

Immediately downstream of intake 14 is a transverse baffle plate 78 connected to a longitudinally extending divider 80 that terminates at the intake. A pair of center ribs 82 are positioned between baffle plate 78 and line of sight 47. Upstream ends 84 of the center ribs terminate a short distance downstream of baffle plate 78 while a downstream end 86 of the center ribs terminates at or slightly upstream of sidewall openings 38. The center ribs are symmetric with respect to the longitudinal chamber axis and they are concavely curved with respect to that axis. The minimum distance between the center ribs, that is the distance between upstream ends 84 or downstream ends 86 is greater than the maximum lateral extent of baffle plate 78.

A pair of relatively short, straight side ribs 88 is disposed between sidewalls 26 and the respective center ribs 82. The side ribs are oriented perpendicular to line of sight 47 and terminate short of the respective ends of center ribs 82 so that the upstream end of the side ribs is downstream of the upstream end of the center ribs and the downstream end of the side ribs is upstream of the downstream end of the center ribs.

This configuration of the chamber 12 upstream of line of sight 47 results in substantially complete laminar flow of gas even though the gas flow entering intake 14 is turbulent. The initial lateral deflection of the center portion of the gas flow by baffle plate 78 and the subsequent reorientation of the flow along sidewalls 26, concavely shaped center ribs 82 and the relatively short side ribs results in a particularly even, laminar flow.

As already pointed out above, the laminar gas flow past line of sight 47 must also be protected against distrubance from atmospheric wind, draft and the like on the exterior of chamber 12. Although columnization of the gas flow between the line of sight and outlet 16 substantially reduces the danger of disturbing the laminar flow and may suffice for some applications, superior results are obtained by providing a deflector 90 which guides the gas flow from outlet 16 through at least about 90° in a direction substantially perpendicular to chamber panels 22. Furthermore, chamber 12 and deflector 19 are preferably secured to an enclosure 92 which defines a space 94 that is fully protected from the atmosphere, atmospheric winds and drafts. A power operated air blower 96 is mounted to enclosure 92 for evacuation of gas from space 94.

Since a primary use of the gas analyzer of the present invention is for analyzing automotive exhaust by gas service stations, mechanics and the like and since the analyzer is frequently used in enclosed or semi-enclosed buildings, it is desirable to reduce the exhaust gas concentration being evacuated from the instrument. It is therefore preferred to provide enclosure 92 with louvres 98 and to provide air blower 96 with a blow rate in excess of the rate with which gas is discharged from chamber 12 into space 94 to thereby continuously draw fresh air past the louvres into space 94. There the fresh air mixes with the exhaust gas and forms a mixture having a relatively low concentration of exhaust gas which can then be evacuated by the air blower without discomforting persons operating the analyzer.

An elongate flexible hose 100 is suitably secured to chamber intake 14 with a fitting 102. A free end 104 of the hose is placed into an exhaust conduit such as an automobile tail pipe 106 with hose 100 being parallel to the tail pipe. Exhaust from the engine flows through the tail pipe and a portion enters hose 100 and hence the interior of chamber 12. By the time a gas reaches line of sight 47 its flow is laminar. Its chemical composition is sensed by detector 42 in the above described manner. From the line of sight the gas flow continues past deflector 90 into enclosure space 94 for evacuation by air blower 96. Even strong, gusty winds on the exterior of enclosure 92 have only a minimal, if any, effect in space 94. The laminar gas flow in the vicinity of openings 38 is still further protected by deflector 90 so that no disturbance of the laminar flow is experienced even if the instrument is used in open air. This assures readings of maximum accuracy.

Referring to FIGS. 6–9, the readings taken by detector 42 vary with the density of gas flowing past line of sight 47 because of variations in the light absorption rate as a function of the gas density. In instances in which the exhaust gas includes water, as does automobile exhaust, the gas density changes linearly with temperature changes and nonlinearly as a function of the (condensed) water vapor content of the gas. If the water vapor content is known, as in automobile exhaust where it is approximately 15 percent and where substantially all water vapor is absorbed in the exhaust gas at temperatures above 130° F. (leaving no condensed water vapor) the actual readings of detector 42 must be adjusted in accordance with the curve of FIG. 8. As can be seen from FIG. 8, the adjustment or compensation increases nonlinearly up to approximately 130° F. At higher temperatures the condensation becomes linear due to the absence of all condensed water vapor.

For practical purposes the temperature of the gas being analyzed, though variable, will not vary beyond known limits. In the case of automobile exhaust the gas temperature at the chamber 12, that is downstream of the automobile tail pipe, will always be between at least about 75° F and at most 130° F when the engine idles. Thus, the output signals from detector 42 can be adjusted to compensate for the density changes within the expectable temperature changes by continuously monitoring the temperature of the gas being analyzed.

For that purpose a temperature probe such as thermistor 108 is secured to one of the chamber panels 22 immediately upstream of line of sight 47 for generating a first, temperature compensating signal which varies linearly with the gas temperature. A relaxation oscillator 110 which operates under positive potential and emits saw-tooth shaped signals is compared with or superimposed in the first signal and fed to a conventional voltage comparator 112. The comparator output is inversely proportional to the voltage of the input signal which in turn varies as a function of the temperature at thermistor 108 and the shape of the saw tooth signal from the oscillator.

Signals from detector 42 are adjusted in a signal gain circuit 114 which is controlled with the output from the voltage comparator. Thus, the detector signal gain compensates for gas density changes within the design range of the instrument, that is, for example, in accordance with the necessary gain indicated by the curve of FIG. 8. In this manner meter 116 indicates a reading that can be corrected to within ±1% of the actual CO or HC gas content over the design temperature range.

Gain control circuit 114 can be adjusted for any desired gain by conventionally selecting proper values for its resistors. With all resistors equal the gain of the circuit is −2 with transistor switch 118 open and −3 with the transistor switch closed. The gain can be varied between −2 and −3 by controlling the duty cycle of the switch. Thus, if the switch is closed 50 percent of the time the average gain, with all resistors of equal value, is −2.5. The a-c component introduced by transistor switch 118 is removed by capacitor 120.

The desired gain curve obtained from gain circuit 114 is obtained by adjusting the degree of curvature of the saw tooth signal generated by oscillator 110 and by modifying the thermistor characteristic with series and-/or shunt resistors. Thereafter the temperature dependent voltage of the thermistor is compared to the saw tooth signal. When the temperature is low the thermistor resistance is high and the comparator input voltage is positive when the oscillator operates between +1 and +4 volts and the thermistor is subjected to a −6 volt dc potential. As long as the input remains positive the comparator output is negative. As the temperature sensed by the thermistor increases the voltage input to the comparator switches at a point on the saw tooth signal determined by the thermistor resistance. Once switched the comparator input becomes negative and its output positive. In this manner transistor switch 118 is repeatedly turned on and off to control the signal gain as a function of the saw tooth curvature and the thermistor characteristics and, therefore, the gas temperature. Variations in the readings of detector 42 due to variations in the gas density are thus compensated so that meter 116 always shows a correctly compensated, accurate reading.

We claim:

1. A method for analyzing a gas of varying temperature and vapor content comprising the steps of continuously flowing the gas from a gas discharging source directly into a chamber and past a line of sight extending laterally through the chamber, monitoring the gas temperature immediately upstream of the line of sight, passing gas analyzing radiation along the line of sight across the gas flow traversing the line of sight, generating a first signal from the radiation which is responsive to the presence of a predetermined substance in the gas, generating a second signal responsive to the gas temperature immediately upstream of the line of sight, changing the second signal into a control signal as a function of both the gas temperature and the vapor content immediately upstream the line of sight, and adjusting the first signal with the control signal to thereby compensate changes of the first signal due to changes in the gas density caused by temperature and vapor content variations.

2. A method according to claim 1 wherein the step of generating the control signal comprises the steps of generating the second signal as a substantially linear function of the gas temperature, generating a sawtooth-shaped signal of a different polarity than that of the second signal, feeding the second and the sawtooth-shaped signal into a voltage comparator for generating a positive comparator output in response to a negative comparator input and vice versa, and adjusting the gain of the first signal with the comparator output in a gain circuit.

3. A method according to claim 1 including the step of maintaining a laminar gas flow past the line of sight by deflecting the gas flow downstream of the line of sight at least about 90°, discharging the gas from the conduit into an enclosed housing, and evacuating gas from the housing at a constant rate, whereby wind and other exterior air turbulences are isolated from the vicinity of the line of sight and turbulences in the gas flow across the line of sight are prevented.

4. A method according to claim 3 wherein the step of evacuating the gas from the housing comprises the step of evacuating the gas at a rate greater than the rate at which gas is discharged into the housing, and including the step of introducing atmospheric air into the housing to form an air gas mixture in the housing and reduce the concentration of gas in the mixture before evacuation from the housing.

5. A method for at least partially determining the contents of an exhaust gas flow comprising the steps of providing a chamber including a transverse line of sight, intake means and an outlet end, placing the intake means into the gas flow to thereby direct a portion of the flow into the chamber, directionalizing the flow in the chamber upstream of the line of sight to obtain a substantially laminar flow across the line of sight, changing the direction of gas flow downstream of the line of sight by at least about 90°, directing a gas analyzing radiation beam along the line of sight through the chamber, determining the presence of at least one predetermined substance in the gas by sensing changes in the radiation beam after the beam has traversed the chamber, and discharging the gas into a space protected from wind and other external air turbulences so that wind and air turbulence have no adverse effect on the laminar gas flow across the line of sight.

6. A method according to claim 5 wherein the step of placing the intake means in the gas flow comprises the step of providing a flexible tubular member of substantial length, orienting a free end of the member parallel to the gas flow, and positioning the free end in the gas flow.

7. A method according to claim 5 wherein the step of directionalizing the gas upstream of the line of sight comprises the steps of deflecting a center portion of the gas flow entering the chamber substantially perpendicularly to the gas flow, and thereafter directing a remainder of the gas flow and the deflected gas flow in a direction substantially perpendicular to the line of sight.

8. In a gas analyzing apparatus having a gas flow chamber with an intake and an outlet, a bottom and a substantially parallel top, and side walls interconnecting the bottom and the top, means for passing gas analyzing radiation along a line of sight across the chamber, and means for generating an output signal from the radiation which is responsive to the presence of at least one predetermined substance in the gas flow, the improvement comprising means for forming a laminar gas flow across the line of sight from a turbulent gas flow adjacent the intake including a transverse plate positioned closely adjacent the intake facing the gas flow entering the chamber for momentarily deflecting a center portion of the flow entering the chamber in a direction substantially perpendicular to the flow direction, the chamber having a width at the line of sight which is substantially greater than at the intake for decreasing the gas flow speed at the line of sight, a pair of spaced apart center ribs symmetrically arranged with respect to a longitudinal center line of the chamber and extending generally in the direction of the gas flow from adjacent lateral ends of the plate to just upstream of the line of sight, and a pair of relatively short side ribs disposed between the center ribs and the sidewalls and having a longitudinal extent substantially less than that of the center ribs.

9. Apparatus according to claim 8 wherein the center ribs have a minimum spacing of more than the lateral extent of the plate.

10. Apparatus according to claim 9 wherein the center ribs are concavely curved with respect to the center line.

11. Apparatus according to claim 10 wherein the side ribs are straight and perpendicular to the line of sight and wherein ends of the side ribs are downstream of an upstream end of the center rib and upstream of a downstream end of the center rib, respectively.

12. Apparatus according to claim 8 wherein the chamber includes apertures for directing light along the line of sight through the chamber, and including means for flowing a clean gas on the exterior of the housing completely past the openings and downstream of the openings to prevent intermixing between the clean gas and the gas flow interiorly of the chamber, and clean gas flowing means including means for forming a miximum clean gas flow speed just upstresm of the opening.

13. Apparatus according to claim 12 wherein the clean gas flow means includes means just upstream of the opening directing the clean gas flow away from the opening at an angle of a few degrees.

14. Apparatus according to claim 8 including means deflecting the gas flow downstream of the line of sight at least about 90° with respect to the bottom of the chamber, a housing defining a wind protected space, and means into the space to prevent gas flow disturbances in the vicinity of the line of sight caused by atmospheric air movements.

15. Apparatus according to claim 14 wherein the housing comprises closed box means, and including power actuated discharge means for evacuating gas from the box means to the atmosphere at a constant rate.

16. Apparatus according to claim 15 wherein the discharge means evacuates the gas at a rate greater than the rate with which gas enters the box means, and including at least one opening in the box means for the intake of air to form a gas-air mixture having a reduced gas concentration.

17. Apparatus for analyzing an exhaust gas traveling through an exhaust gas conduit, the exhaust gas having a temperature varying within known limits and a vapor content which is a function of the exhaust gas temperature, the exhaust gas including relatively large concentrations of surface contaminating substances, the apparatus comprising: a chamber having an intake and an outlet, spaced apart, substantially parallel panels and a pair of opposing, spaced apart chamber walls connecting the panels and thus defining a passage for the gas, the walls including aligned openings defining a line of sight through the chamber, means defining a flow passage for a second, non-contaminated gas parallel to the sample flow along the exterior of the chamber walls, across the openings and terminating in passageway outlet portions disposed downstream of the openings, the flow passage means defining an extension of the line of sight past the flow passage means, a radiation source mounted adjacent one of the line of sight extensions, a radiation detector mounted adjacent the other one of the line of sight extensions for generating a meter signal, radiation filter means disposed between the source and the detector to remove radiation other than of at least one predetermined wavelength from the radiation emitted by the source before the radiation contacts the detector, whereby the presence of a predetermined substance in the gas is sensed by the detector and results in a detector signal which is a function of the substance, means for generating a first signal responsive to the gas temperature immediately upstream of the line of sight, means for adjusting the first signal into a control signal as a function of both the gas temperature and the vapor content of the gas as determined by the gas temperature, means for adjusting the gain of the detector signal with the control signal to thereby compensate detector signal changes due only to variations in the gas density caused by temperature and vapor content variations, and means for inducing the second, noncontaminated gas flow in the passage defining means past the openings.

18. Apparatus according to claim 17 wherein the means for adjusting the first signal into a control signal comprises means for generating a second signal, means for comparing the first and second signals and generating a trigger signal responsive to the first and second signals, and circuit means including switch means actuated by the trigger signal for nonlinearly adjusting the gain of the detector signal as a function of the time during which the switch means is closed.

19. Apparatus for analyzing an exhaust gas flowing through an exhaust conduit for the presence of at least one predetermined substance, comprising: a chamber having a bottom, a parallel top and spaced apart interconnecting sidewalls, an intake and an outlet longitudinally spaced at respective ends of the bottom and the top, openings in the sidewalls defining a line of sight through the chamber, a portion of the sidewalls being nonparallel, the spacing between the sidewalls being substantially greater in the vicinity of the line of sight than in the vicinity of the intake, means for transforming the gas flow into a laminar gas flow past the line of sight including a baffle plate between the bottom and the top facing gas entering the chamber at the intake and deflecting at least a portion of the entering gas towards the sidewalls, a longitudinally oriented flow separating rib between the chamber intake and the baffle wall, spaced apart center ribs between the baffle wall and the line of sight having a concave configuration with respect to a longitudinal axis through the chamber and a minimum spacing greater than a lateral width of the baffle wall, side ribs disposed between the center ribs and adjacent portions of the sidewalls, having a longitudinal extent substantially less than that of the center ribs and being disposed intermediate ends of the center ribs, exhaust gas intake hose means connected to the chamber intake for placement of a free end of the hose means in the conduit and diverting part of the exhaust gas flow from the conduit through the hose means directly into the chamber, radiation sensitive detecting means mounted to the chamber along the line of sight for detecting the presence of the substance in exhaust gas traversing the line of sight, and means for preventing atmospheric air movements in the vicinity of the chamber from causing exhaust gas flow turbulence at the line of sight comprising a gas flow deflector downstream of the line of sight changing the gas flow direction by at least about 90° with respect to the gas flow in the chamber, means defining an enclosed space into which the deflected gas flow is discharged, and means for evacuating gas from the space to the atmosphere.

20. Apparatus according to claim 19 wherein the evacuating means comprises power operated ventilating means evacuating the gas at a substantially constant rate.

21. Apparatus for analyzing an exhaust gas for at least one predetermined substance comprising: a chamber having an intake and an outlet, spaced apart, substantially parallel panels and a pair of opposing, spaced apart chamber walls connecting the panels and thus defining a passage for the gas, the walls including aligned openings defining a line of sight through the chamber, a portion of the sidewalls being nonparallel, the spacing between the sidewalls being substantially greater in the vicinity of the line of sight than in the vicinity of the intake, means for transforming the gas flow into a laminar gas flow past the line of sight including a baffle plate between the bottom and the top facing gas entering the chamber at the intake and deflecting at least a portion of the entering gas towards the sidewalls, a longitudinally oriented flow separating rib between the chamber intake and the baffle plate, spaced apart center ribs between the baffle plate and the line of sight having a concave configuration with respect to a longitudinal axis through the chamber and a minimum spacing greater than a lateral width of the baffle plate, side ribs disposed between the center ribs and adjacent portions of the sidewalls, having a longitudinal extent substantially less than that of the center ribs and being disposed intermediate ends of the center ribs, exhaust gas intake hose means connected to the chamber intake for placement of a free end of the hose means in the conduit and diverting part of the exhaust gas flow from the conduit through the hose means directly into the chamber, means for preventing atmospheric air movements in the vicinity of the chamber from causing exhaust gas flow turbulence at the line of sight comprising a gas flow deflector downstream of the line of sight changing the gas flow direction by at least about 90° with respect to the gas flow in the chamber, means defining an enclosed apace into which the deflected gas flow is discharged, and means for evacuating gas from the space to the atmosphere, a radiation source mounted adjacent one of the openings, a radiation detector mounted adjacent the other one of the openings for generating a meter signal, radiation filter means disposed between the source and the detector to remove radiation other than of at least one predetermined wavelength from the radiation emitted by the source before the radiation contacts the detector, whereby the presence of a predetermined substance in the gas is sensed by the detector and results in a detector signal which is a function of the substance, means for generating a first signal responsive to the gas temperature immediately upstream of the line of sight, means for adjusting the first signal into a control signal as a function of both the gas temperature and the vapor content of the gas as determined by the gas temperature, and means for adjusting the gain of the detector signal with the control signal to thereby compensate detector signal changes due only to variations in the gas density caused by temperature and vapor content variations.

* * * * *